United States Patent
Niemanns

[15] 3,665,646
[45] May 30, 1972

[54] SEALING STRIP
[72] Inventor: Gerd Niemanns, Viersen, Germany
[73] Assignee: Draftex GmbH, Viersen, Germany
[22] Filed: Mar. 9, 1970
[21] Appl. No.: 17,414

[30] Foreign Application Priority Data
July 29, 1969 Germany.....................P 19 39 169.6

[52] U.S. Cl....................................49/490, 49/495, 52/716
[51] Int. Cl.........................................................E06b 7/23
[58] Field of Search...................49/490, 484, 491, 495, 496, 49/497; 52/716–718

[56] References Cited

UNITED STATES PATENTS

| | | | |
|---|---|---|---|
| 2,226,615 | 12/1940 | Killen | 49/490 X |
| 2,968,072 | 1/1961 | Bright | 49/491 |
| 3,002,783 | 10/1961 | Hofmeister | 49/490 |
| 3,167,825 | 2/1965 | Zoller | 49/490 |

FOREIGN PATENTS OR APPLICATIONS

| | | | |
|---|---|---|---|
| 1,356,712 | 2/1964 | France | 49/491 |
| 1,102,086 | 2/1968 | Great Britain | 49/491 |

Primary Examiner—David J. Williamowsky
Assistant Examiner—Philip C. Kannan
Attorney—Ernest F. Marmorek

[57] ABSTRACT

A U-shaped sealing strip adapted to be mounted on a support, especially for use in doors, trunk lids and the like of automobiles, comprising a firm sealing lip extending outwardly away from the apex portion of the U-shaped sealing strip, and a second sealing lip connected to and extending outwardly away from one leg of the U-shaped sealing strip in a direction away from the apex portion and extending beyond a plane which is perpendicular to the plane of symmetry of the U-shaped sealing strip and which passes through the edge of the end of one leg, the second sealing lip being adapted to sealingly rest against a member extending at an angle with respect to the support.

6 Claims, 2 Drawing Figures

Patented May 30, 1972   3,665,646

Inventor:
Gerd Niemanns,
By [signature]
His Attorney.

SEALING STRIP

BACKGROUND OF THE INVENTION

The present invention relates to a sealing strip having a U-shaped profile and adapted to be mounted on a supporting flange. Such sealing strips for use in doors and trunk openings of automobiles are known, sometimes in a form in which the crown or apex of the U-shaped sealing strip is provided with a special sealing lip pointing towards the outside and against which a door, trunk lid, or the like rests when closed.

Such sealing strips have, however, the disadvantage that when subjected to large amounts of water and dirt, the seal very often is not tight.

It is, therefore, an object of the present invention to overcome the disadvantages of heretofore known such sealing strips, and in particular, to provide a sealing strip which is fully effective even under extreme conditions, such as heavy rain fall.

SUMMARY OF THE INVENTION

The U-shaped sealing strip provided with a sealing lip at the apex portion of the U-shaped profile to rest against a door, trunk lid or the like, is in accordance with the present invention, characterized primarily in that one leg of the U-shaped sealing strip carries a sealing lip projecting laterally outwardly at an angle and pointing away from the apex and extending beyond a plane passing through the outer edge of this leg of the profile and extending perpendicularly to the plane of symmetry of the sealing strip, and in that this lip upon being mounted on a supporting flange sealingly rests against a member extending from the body of the vehicle at an angle preferably at a right angle with respect to the supporting flange.

In accordance with a further development of the present invention, the sealing strip can be supplemented by a decorative strip having U-shape and being mounted on that leg of the U-shaped sealing strip which is not equipped with the lateral sealing lip so that that leg thereof which is located within the interior space of the sealing strip likewise rests against the supporting flange and contributes to the total sealing effect.

Advantageously, the sealing lips form one unitary structure with the sealing strip.

BRIEF DESCRIPTION OF THE DRAWING

The invention will become more readily apparent from the following description of a preferred embodiment thereof shown, by way of example, in the attached drawing, in which.

DETAILED DESCRIPTION OF A PREFERRED EMBODIMENT

Figure 1:
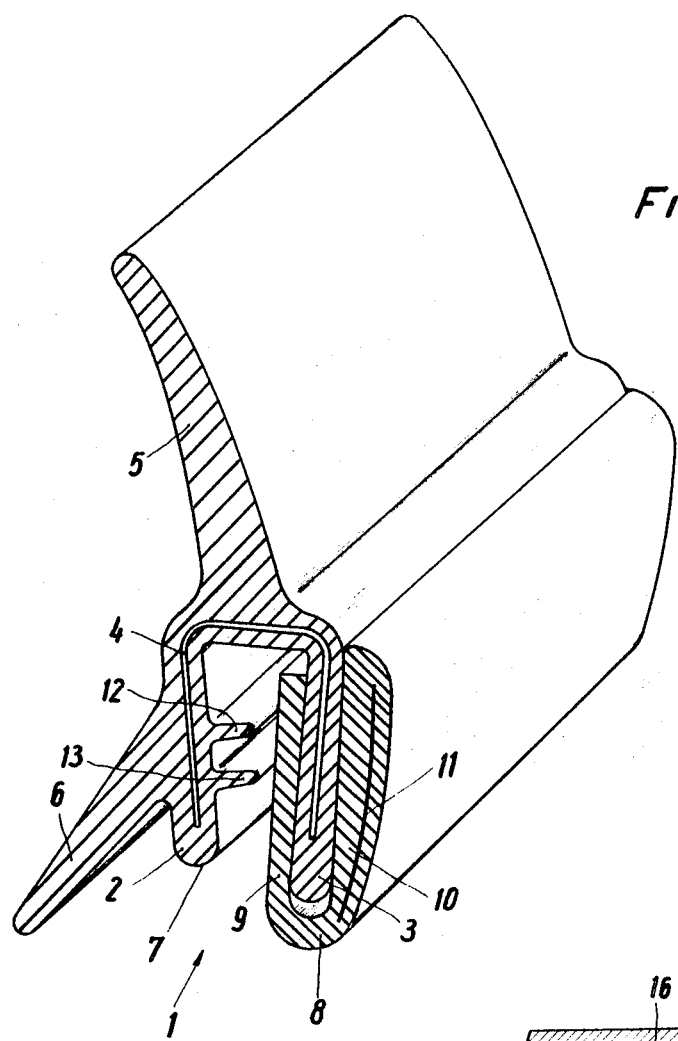
FIG. 1 illustrates the sealing strip according to the present invention, in a perspective cross sectional view.

Referring now to the drawings in detail, the U-shaped sealing strip 1 comprises legs 2 and 3 and a metallic insert 4, preferably made of steel. A sealing lip 5 extends from the crown or apex portion of the profile outwardly, in a manner known per se. In operative condition, a door or trunk lid, or the like, 16 rests against this lip (see FIG. 2).

In accordance with the present invention, the leg 2 of the sealing strip carries a further lip 6 which extends laterally at an angle away from the crown or apex portion of the U-shaped profile in such a way that it extends through and beyond a plane defined by the outer edge 7 of the leg 2 and extending perpendicularly to the plane of symmetry of the sealing strip. Upon placement of the sealing strip 1 onto a supporting flange 14 (FIG. 2), lip 7 will rest against a portion 15 of the automobile body or trunk which extends at an angle with respect to the supporting flange 14.

A decorative strip 8 is frequently used with doors or trunk lids of automobiles. This decorative strip 8 points toward the interior of the automobile, is of a U-shaped profile, and surrounds leg 3 of the sealing strip in such a way that its portion 9 is located in the interior of the sealing strip 1 and that it rests against the supporting flange 14 upon placement of the sealing strip thereon. Leg 10 of the decorative strip 8 located on the outside is provided with a thin metal insert 11.

Figure 2:
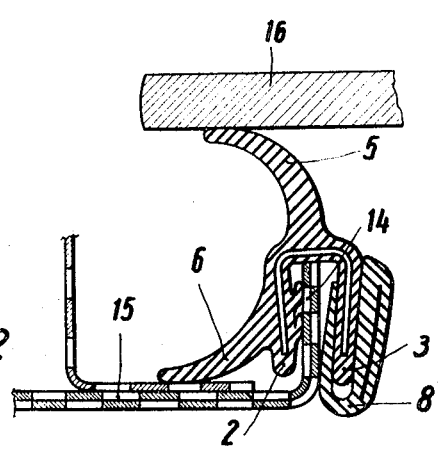
FIG. 2 shows the sealing strip of FIG. 1 when mounted on a supporting flange.

In operative position, illustrated in FIG. 2, the lateral sealing lip 6 rests against the portion 15 extending perpendicularly to the supporting flange 14, while the door or trunk lid 16 in closed condition rests against the sealing lip 5. The interior of the car or trunk is to the right of the decorative strip 8. Leg 2 of sealing strip 1 has the interior thereof provided with holding ribs 12 and 13 which tightly rest against the supporting flange 14 in assembled condition, as likewise shown in FIG. 2.

In view of the cooperation of the two sealing lips 5 and 6, one of which sealingly rests against the door, lid or the like, whereas the other rests against a portion of the car body extending substantially perpendicularly from the supporting flange, a complete seal of the interior of the automobile or trunk is obtained, thus preventing penetration of moisture and dirt.

From the above, it is apparent that although the invention has been described hereinbefore with respect to a specific embodiment thereof, it is evident that many modifications and changes may be made without departing from the spirit of the invention. Accordingly, by the appended claims, it is intended to cover all such modifications and changes as fall within the true spirit and scope of this invention.

I claim:

1. A U-shaped sealing strip adapted to be mounted on supporting means, especially for use in doors, trunk lids and the like of automobiles, comprising a first sealing lip extending outwardly away from the apex portion of the U-shaped sealing strip, and a second sealing lip connected to and extending outwardly away from one leg of the U-shaped sealing strip in a direction away from said apex portion and extending beyond a plane which is perpendicular to the plane of symmetry of said U-shaped sealing strip and which passes through the edge of the end of said one leg, said second sealing lip being adapted to sealingly rest against a member extending at an angle with respect to said supporting means, and further comprising a U-shaped decorative strip placed upon and surrounding the other leg of said U-shaped sealing strip, that leg of said U-shaped decorative strip which is located between the two legs of said U-shaped sealing strip being adapted to sealingly engage said supporting means.

2. A U-shaped sealing strip according to claim 1, wherein said one leg of said U-shaped sealing strip is, on that side which faces the other leg, provided with gripping ribs for engagement with said supporting means.

3. A U-shaped sealing strip according to claim 1 wherein said sealing strip and said first and second lips form a unitary structure.

4. A sealing strip according to claim 1, which includes a U-shaped metallic insert embedded therein and extending from one leg through said apex portion to the other leg.

5. A sealing strip according to claim 1, wherein at least one of the legs of said U-shaped decorative strip is provided with a metallic insert.

6. A sealing strip according to claim 5, wherein said metallic insert is provided in that leg of said U-shaped decorative strip which is located outside said U-shaped sealing strip.

* * * * *